United States Patent [19]
Espie et al.

[11] Patent Number: 5,382,402
[45] Date of Patent: Jan. 17, 1995

[54] TIRE MOLD AND METHOD OF MOLDING A TIRE BY MEANS OF SUCH A MOLD

[75] Inventors: Jacques Espie, Pont-du-Chateau; Daniel Lefevre, La Roche Blanche, both of France

[73] Assignee: Compagnie Generale des Etablissements Michelin - Michelin & Cie, Clermont-Ferrand Cedex, France

[21] Appl. No.: 82,755

[22] Filed: Jun. 25, 1993

[30] Foreign Application Priority Data

Jul. 2, 1992 [FR] France ............... 92 08299

[51] Int. Cl.6 ............... B29C 35/02; B29D 30/72
[52] U.S. Cl. ............... 214/326; 156/87; 425/32; 425/37; 425/812
[58] Field of Search ............... 264/315, 326; 425/812, 425/32, 37; 156/116, 87

[56] References Cited

U.S. PATENT DOCUMENTS

| | | |
|---|---|---|
| 1,371,501 | 3/1921 | McLane . |
| 3,474,498 | 10/1969 | Hoppes ............... 425/812 |
| 3,518,335 | 6/1970 | Jablonski ............... 264/315 |
| 5,038,504 | 8/1991 | Modigh . |
| 5,234,326 | 8/1993 | Galli et al. ............... 425/812 |

FOREIGN PATENT DOCUMENTS

| | | |
|---|---|---|
| 999395 | 1/1952 | France . |
| 2541624 | 8/1984 | France . |
| 63-264308 | 11/1988 | Japan . |
| 679917 | 5/1992 | Switzerland . |

OTHER PUBLICATIONS

Patent Abstracts of Japan, vol. 14, No. 107 (M-942) (4050) 27 Feb. 1990, JP A1310913 (Toyo Tire & Rubber Co. Ltd.).

*Primary Examiner*—Mathieu D. Vargot
*Attorney, Agent, or Firm*—Brumbaugh, Graves, Donohue & Raymond

[57] ABSTRACT

In order to assure excellent molding of the tire at the place of the markings appearing on the side wall of a tire, the shell of the mold has cutouts which correspond to the shape of the marking, the cutouts containing removable closures which admit material for molding the markings while permitting venting of the cutout. In one embodiment the removable closure is an insert which slides in the cutout. It is possible to adjust the relief of the marking. Venting is assured by the clearance between the insert and the cutout.

11 Claims, 3 Drawing Sheets

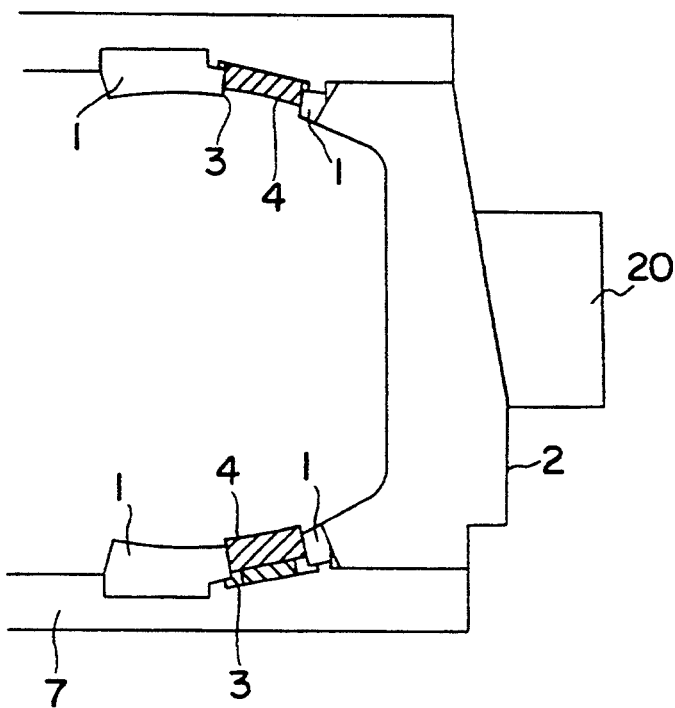
FIG.IA
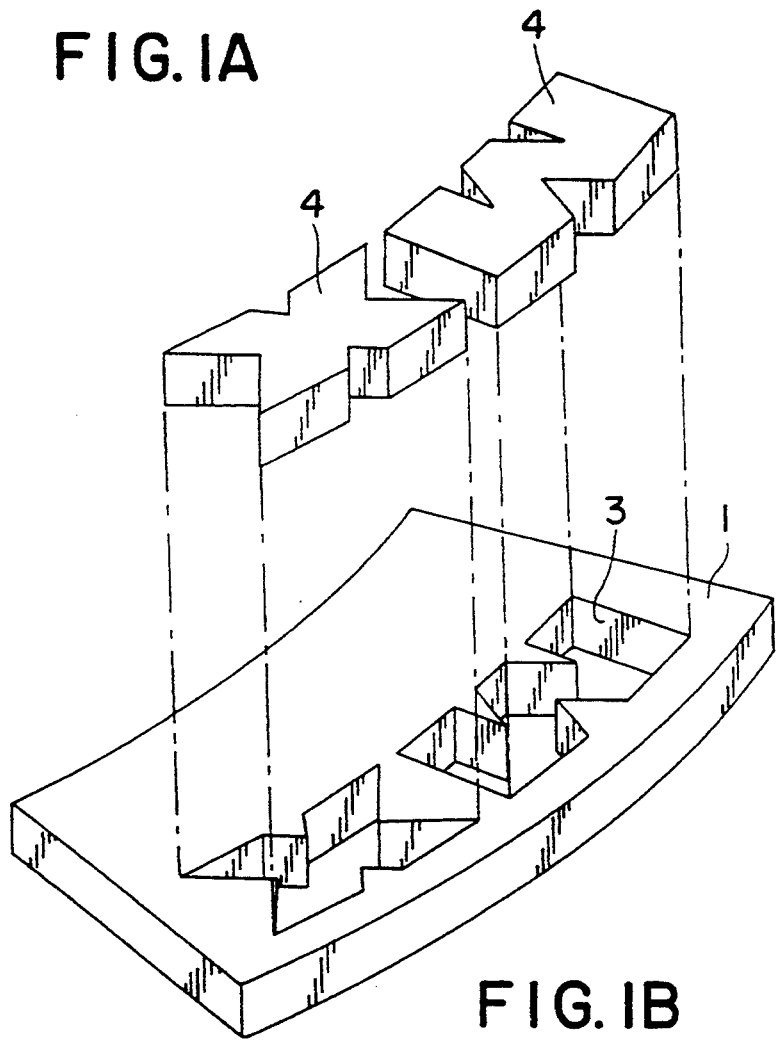
FIG.IB

TIRE MOLD AND METHOD OF MOLDING A TIRE BY MEANS OF SUCH A MOLD

BACKGROUND OF THE INVENTION

The present invention relates to tire molds. More particularly, it relates to the molding of the markings provided on the sidewalls of the tires.

It is well known that the sidewalls of tires bear a large number of markings: the name of the manufacturer, the type of tire, its size, as well as the markings required by the regulations concerning the plant of manufacture, the date of manufacture, and the loading or speed capacity of the tire, and even other markings. These markings are produced by providing the negatives corresponding to these markings on the mold. The part of the mold which assures the molding of the outer surface of the sidewall of a tire is known as the shell. It comprises letters machined in the mass as well as removable plates used for the markings which contain indications which must be regularly changed, such as, for instance, the period of manufacture of the tire. An example of such a removable plate is given in U.S. Pat. No. 4,547,139.

At the present time efforts are being particularly directed to the presentation of those markings of an advertising nature. For instance, purely decorative motifs are added on the sidewall of the tire in order to create in the mind of the consumer a means of identifying the unit of a range of products of a manufacturer. The name of the manufacturer and the type of tire must appear on the sidewall of the tire in as attractive a manner as possible. This leads the designers of tires to provide markings in relief or recessed with reference to the surface of the sidewall of the tire and/or to produce on the marks striations intended to make the letters stand out with respect to the sidewall of the tire. It is desirable to leave as great as possible a latitude for the design of the markings with respect to their shape and appearance. Furthermore, it is desirable that the quality of the molding remain perfect, that is to say that no molding defect appears, such as, for instance a lack of rubber in certain regions of the markings, due to air pockets in the mold.

SUMMARY OF THE INVENTION

The object of the present invention is to facilitate the reproduction of markings in the molding of engravings appearing on the shell of the tire molds. One purpose of the invention is to eliminate all the venting problems which exist when it is attempted to produce markings constituting a substantial relief on the sidewalls of the tires while avoiding having to provide vent holes on the shells of the molds. Another purpose of the invention is to be able to more easily obtain a contrast effect between the sidewall of the tire and the markings molded on it. Another object of the invention is to be able to propose a solution which is adapted both to the marking of letters and numbers and to that of logos and other distinctive signs.

In accordance with the invention, the tire mold, which has at least one shell for molding the outer surface of a tire sidewall, said shell containing the negative of markings of a contour which is to be molded on said sidewall, is characterized by the fact that, at least in the case of certain markings, the molding face of the shell has a cutout having a shape which corresponds precisely to the contour of said marking, the cutout being plugged by a removable attached mold plugging or insert part, the clearance present between the shell and the removable part being placed in communication with the outside of the mold in order to assure the venting.

The invention is applicable to any type of marking but it is particularly of interest for use in the case of markings of rather large area such as the letters of the manufacturer or the identification of the size and type of tire. The invention proposes several different methods for producing the attached part, all of which provide clearance over the entire periphery of the marking. Due to this, the air pushed back upon the molding of the rubber finds a path to escape along the entire boundary of each marking. This affords the possibility of producing markings of very substantial relief, for instance greater than 0.5 mm, while previously it was very difficult to be able to assure perfect molding if the engraving recessed in the mold had a depth of more than a few tenths of a millimeter, since in such case pockets of air were imprisoned upon the molding.

The invention will be better understood by reference to the following description, read in conjunction with the drawings, which will make all aspects of the invention clearly understood.

DESCRIPTION OF DRAWINGS

FIG. 1 is a radial section through a mold in accordance with the invention.

FIG. 1 bis is a perspective view showing the markings.

DESCRIPTION OF PREFERRED EMBODIMENTS

Figure 2:
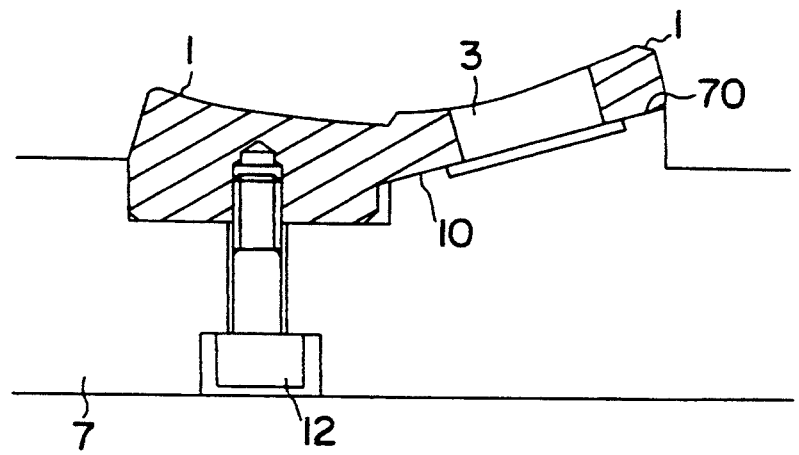
FIG. 2 is a radial section through a mold shell.
Figure 3:
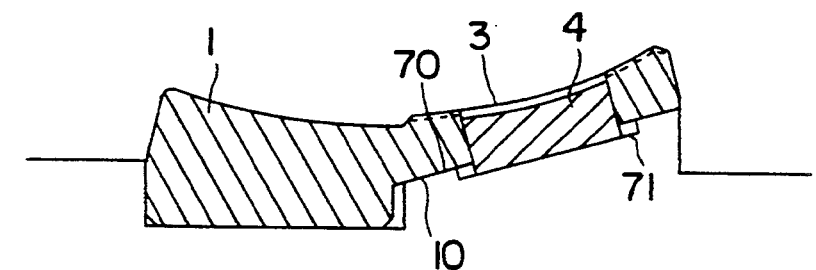
FIGS. 3 and 4 illustrate two uses of the mold of the invention in order to effect a marking in relief (FIG. 3) or recessed (FIG. 4).
Figure 4:
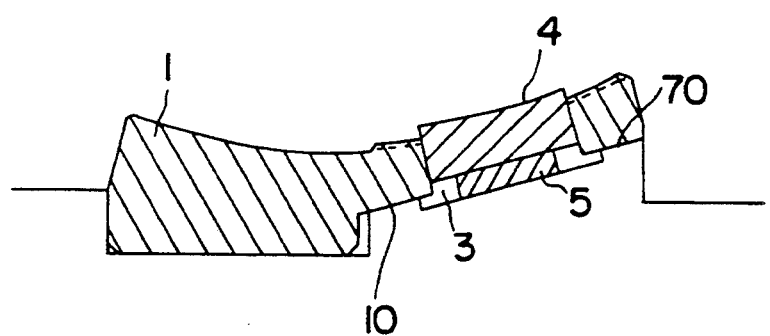
Figure 5:
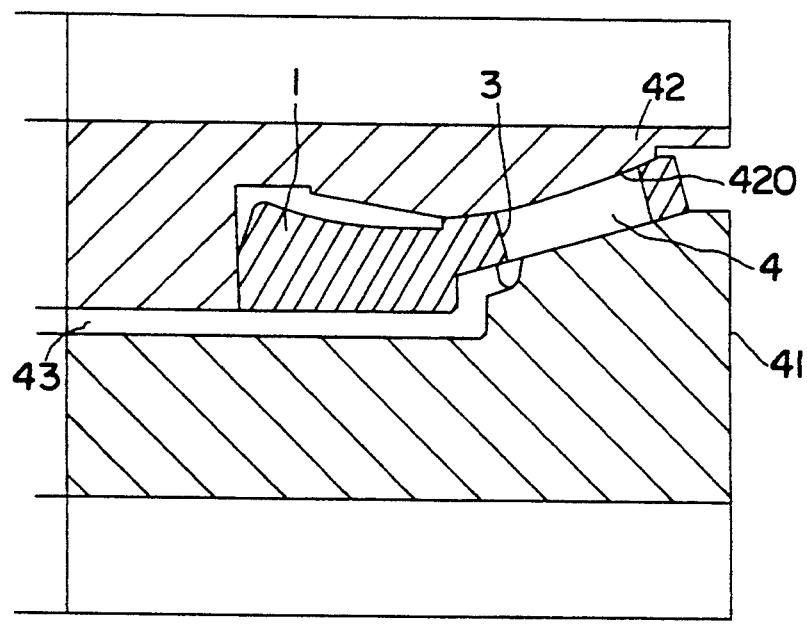
FIG. 5 illustrates an injection mold with an attached part.

A complete radial section of the mold of the invention is shown in FIG. 1 in which the shells 1 and the sectors 2 are held closed by a conical hoop 20. The shell 1 has a cutout 3 formed therein as an exact image of the contour of the marking. It is seen that the markings are letters shown in FIG. 1 bis In FIGS. 2 to 5 it is seen that the rear face of the shell 1 has a flat surface 10 developed parallel to a tangent to the inner profile of the shell as viewed in radial section. The tangent in question is selected so as to correspond to the average inclination of the zone of the shell 1 having the cutouts 3. The face 10 opposite the face which molds the rubber is referred to as the rear or outer face of the shell 1, the molding face being called the front or inner face.

Due to this development, the thickness of the shell 1 is substantially constant in the entire zone in which the cutouts 3 are made. The design and insertion of the attached parts is facilitated thereby. The shell 1 is mounted on a support 7, the shape of which corresponds to the rear or outer shape of the shell 1. The support 7 has a flat resting face 70 which corresponds to the flat surface 10 formed on the shell 1. The shell 1 is held in place on the support 7 by means of screw 12 (see FIG. 2).

The cutout, which has the exact shape of the marking to be obtained, can be produced by different technical means which are well known to the person skilled in the art, namely by electro-erosion by indenting, electro-erosion by wire, cutting out with a cutting tool, laser cutting or else cutting by a jet of water under high pressure.

Three variant embodiments of the removable part are proposed in the present invention. One of these variants is described, in particular, with reference to FIGS. 3 to 5. The removable mold plugging part is an insert 4 made in the exact shape of the marking to be obtained. It is slidably mounted in the cutout 3, and means are provided for blocking the sliding of the insert 4, possibly only in one direction. By varying the position of this insert 4 with respect to the shell 1, one can obtain, upon the molding, markings either in relief (see FIG. 3) or recessed (see FIG. 4). The adjustment of the depth of penetration or of protrusion of the insert 4 with respect to the shell is very simple; it is sufficient to provide a wedge 5 as a function of the position desired. Under the effect of the molding pressure of the tire, the insert 4 has a tendency to move backward with respect to the shell and its sliding is blocked by the wedge 5.

The insert can be made of any material. A material which can be cast is preferably employed. It is very advantageous to make use of the shell 1 itself in which the cutout or cutouts have been produced as a constituent element of an injection mold. Due to two covers 41, 42 which fit exactly on the inner and outer faces of the shell 1 (see FIG. 5), a molding space is defined into which the material constituting the insert can be injected. The cover 41 covering the outer face of the shell 1 has an injection channel 43 leading to each of the cutouts 3.

The method of producing an insert 4 consists therefore in injecting a material in liquid phase into the mold formed in this manner. After solidification, the covers 41, 42 are removed as well as the excess material on the insert, which has solidified in the injection channel 43. One then verifies the sliding of the inserts 4 or else removes them from the mold. The part 420 of the cover 42 which closes the injection space of the insert 4 may have a surface finish which makes it possible to confer upon the insert 4 a rough or grained appearance or else a very smooth appearance. It is also possible to carry out a surface treatment in order to impart to the appearance of the molded tire at the place of the markings substantial contrast with respect to the appearance of the rubber molded by the rest of the shell. This may involve a surface covering or a mechanical treatment by shot-blasting or machining.

The insert 4 developed in this manner has a thickness which corresponds precisely to the thickness of the shell 1 at the place of the cutout 3. In this case, if it is desired to obtain a marking which appears in relief on the tire, it is necessary to drive the insert 4 correspondingly outwards with respect to the surface of the shell 1. In order to permit the movement of the insert 4 with respect to the shell, the support 7 comprises sufficient clearance obtained by means of a groove 71 provided on the surface 70 facing the position of the cutouts 3.

Due to the clearance which is always present between the insert 4 and the shell 1 and between the shell 1 and the support 7, the air imprisoned upon the molding of the tire is able to escape towards the outside. A venting of the mold is obtained which leaves no visible trace on the tire. If the clearance between the insert 4 and the shell 1 is sufficiently small (typically less than 0.05 mm), then the air can escape through the slot without the rubber being able to flow between the insert 4 and the shell 1. If the clearance is slightly greater, it is possible that a small amount of rubber flows between the shell 1 and the insert 4. This may result in a small molding burr. However, as this is located precisely on the trace corresponding to the boundary of the marking, this molding burr remains very slight, so that the aesthetic appearance of the molded tire does not suffer therefrom. One can, of course, assist the flow of the air towards the outside by providing grooves between shell 1 and support 7 which assure the passage of the air towards the outside of the mold.

Due to the fact that the inserts which assure the molding of the markings on the sidewall of the tire are made in the form of parts separate from the shell, there is very great latitude in design for the production of the molding faces of the rubber on these inserts. This makes it possible to produce faces which are different from the surface of the shell from the standpoint of their roughness or the standpoint of their shape, which, for instance, may be flat.

We may note in passing that in the case of letters such as A, B, D, and 0 or other letters or signs which have a closed contour, it is necessary to machine or mold the insert in such a manner that there is a difference in level between the contour and the closed surface surrounded by the contour, such as, for instance, the inside of an O. In the event that the letter appears recessed on the sidewall of the tire, and depending on the depth of the relief surrounded by the contour of the marking, it may be desirable to improve the venting by providing a small transverse vent hole substantially parallel to the surface of the shell in order to conduct the air from the inside towards the outside of the contour of the marking. In an alternative solution, the principle of this invention is then-applied to the imprisoned surface by disconnecting it from the letter proper.

When the cutout 3 is made by cutting the material, for instance wire cutting, the piece cut out can be used to produce the insert 4, after an electrochemical depositing of metal in order to compensate for the difference in section.

In the event that it is desired to produce only a marking in relief on the tire, and in the event that it is not desired to be able to regulate the height of this relief, a different solution can be used, two variants of which are described with reference to FIGS. 6 and 7.

The cutout 3 in question is still a continuous opening, that is to say, extends throughout the thickness of the shell 1. This time, it is seen that the cutout 3 comprises a shoulder 30. The section of the cutout located between the inner surface of the shell 1 and the shoulder 30 is designated by the reference numeral 31 and is cut out along the exact contour of the marking as in the other variant embodiments. Beyond the shoulder 30, on the outer side of the mold, the section of the cutout 3 is enlarged and it may be of any contour whatsoever.

Figure 6:
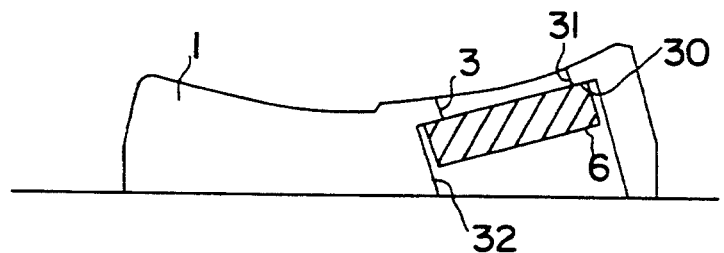
FIG. 6 illustrates a second variant with an attached part.

In FIG. 6, the attached part is a simple plate 6 which abuts against the shoulder 30 and the wedging of which is assured (screw, spring, wedges) so that it does not move under the effect of the force caused by the molding. Here also, the clearance present between the plate 6 and the shoulder 30 permits the passage of the air and thus assures a perfect venting of the mold at the level of the markings. A circular groove 32, the bottom of which constitutes the shoulders of several cutouts, is preferably produced on the rear of the shell. The groove is a circular arc or a complete circle, depending upon the extent of the markings made. The attached part is a closure plate 6 common to several cutouts or to all the cutouts. The closure plate 6 corresponding to this embodiment is simpler to produce.

Figure 7:
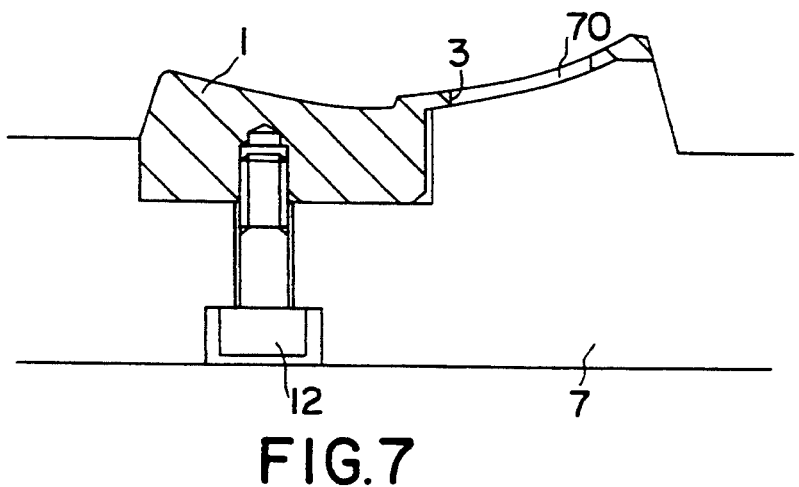
FIG. 7 illustrates a third variant of an attached part.

In FIG. 7, it is seen that the attached part is integrated in the rear support 7 of the shell 1. This variant is of particular interest when it is necessary to provide markings all around the shell 1. In that case, the part of the shell i at the place of the markings has a thickness corresponding substantially to the overthickness of the markings which it is desired to obtain. The rear face 10 of the shell at this place is flat, or else follows the profile of the front part. The support has a protuberance 70 of shape corresponding to the shape of the rear face 10 of the shell at the place of the markings. The protuberance 70 masks the bottom of the cutout 3, in the same way as the plate 6 of the previous variant. The molding face of both the place 6 and that of the protuberance 70 can also be the object of a treatment such as explained above with regard to the insert 4 in order to modify the surface appearance of the molded rubber with respect to said plate 6 or said protuberance 70.

We claim:

1. A tire mold having at least one shell for molding the outer surface of a tire sidewall with a marking of a contour to be molded on said sidewall, the shell comprising a cutout the shape of which on a molding face of the shell corresponds precisely to a negative of the contour of said marking, and a mold plugging part having a surface which closes the cutout, a clearance between the cutout and said mold plugging part being in communication with the outside of the mold in order to assure venting of the mold.

2. A mold according to claim 1, in which said mold plugging part is an insert slidably mounted in the cutout and including means for blocking the sliding of the insert.

3. A mold according to claim 1, in which the cutout comprises a shoulder, the section of the cutout being enlarged beyond the shoulder on the outer side of the mold as compared with the section of the cutout located between the shoulder and the inside of the mold, and the said mold plugging part abuts against the shoulder.

4. A mold according to claim 1, in which the mold plugging part is integrated with a support on which the shell is mounted.

5. A mold according to claim 1, in which the molding face of said mold plugging part is a surface treated in order to produce the appearance on the markings of molded rubber of a surface which contrasts with the appearance of the surface of the molded rubber elsewhere on the shell.

6. A mold according to claim 1, in which the rear face of the shell has a flat surface parallel to a tangent to the inner profile of the shell viewed in radial section, the tangent selected being that of average inclination in the zone of the shell corresponding to the cutouts, and in which the shell is mounted on a support of shape corresponding to said rear face of the shell and has a flat resting face corresponding to said flat surface on the shell.

7. A mold according to claim 3, in which the rear of the shell comprises a circular groove the bottom of which constitutes the shoulders of several cutouts, and in which the part is formed of a closure plate which is common to several cutouts.

8. A method of molding a tire having, on at least one of its sidewalls, a marking molded by means of a mold having at least one shell for molding the outer surface of a tire sidewall with a marking of a contour to be molded on the sidewall, the shell comprising a cutout the shape of which on a molding face of the shell corresponds precisely to a negative of the contour of the marking, a mold plugging part having a surface which closes the cutout, a clearance between the shell and the mold plugging part being in communication with the outside of the mold and in which the markings are recessed or in relief on the surface of the sidewall, including filling the mold and cutout with material for molding the tire and venting the mold by the clearance between the cutout and said mold plugging part.

9. A method of molding according to claim 8, in which the relief or recess of the markings is greater than 0.5 mm.

10. A method of molding a tire in a mold having at least one shell for molding the outer surface of a tire sidewall, the shell having a cutout the shape of which corresponds to a negative of the contour of a marking to be molded on the tire sidewall, comprising positioning a surface of a mold plugging part relative to the cutout to close the cutout and define a mold for the marking, a clearance between the cutout and the mold plugging part surface being in communication with the outside of the mold in order to vent the cutout around the outer periphery of the marking to be molded, and filling the mold and cutout with material for molding the tire to form the marking on the tire defined by the cutout and the mold plugging part surface which closes the cutout while permitting venting through the clearance between the cutout and the mold plugging part.

11. A method of molding as set forth in claim 10, in which the mold plugging part surface which closes the cutout is an insert for the cutout, slidably mounting the insert in the cutout and blocking the sliding of the insert within the cutout.

* * * * *